Jan. 18, 1966  R. L. DENISTON  3,230,431
COMBINATION FEED-THROUGH AND TRIMMER CAPACITOR
Filed Sept. 20, 1962
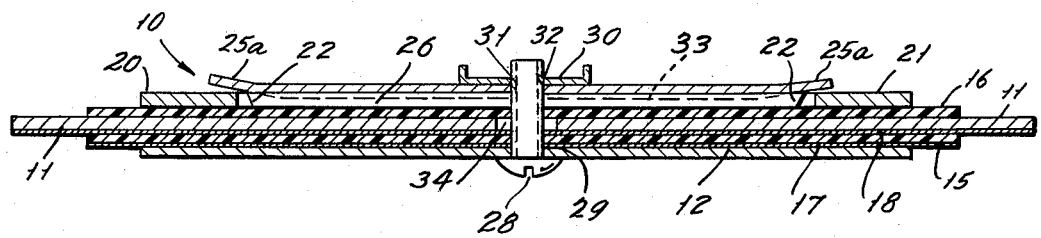
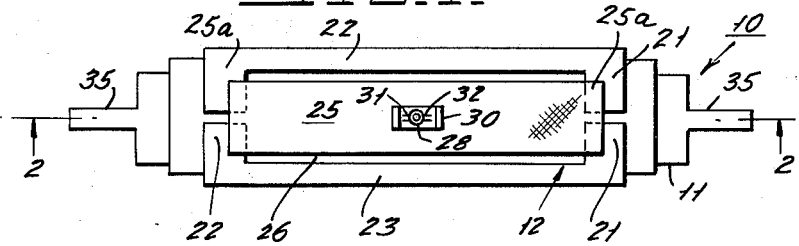
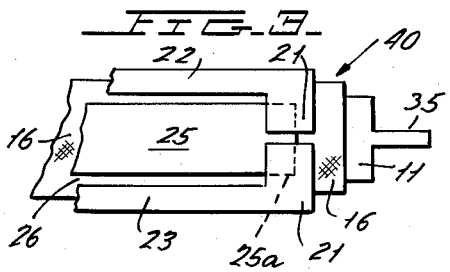
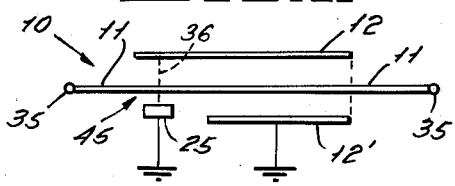
INVENTOR.
RICHARD L. DENISTON
BY
OSTROLENK, FABER, GERB & SOFFEN
ATTORNEYS

United States Patent Office 3,230,431
Patented Jan. 18, 1966

3,230,431
COMBINATION FEED-THROUGH AND TRIMMER CAPACITOR
Richard L. Deniston, Monterey Park, Calif., assignor to Standard Kollsman Industries, Inc., Melrose Park, Ill., a corporation of Illinois
Filed Sept. 20, 1962, Ser. No. 224,961
11 Claims. (Cl. 317—249)

This invention relates generally to feed-through capacitors, and more particularly to novel capacitors of this type incorporating capacitance trimming means.

V.H.F. television station selectors, termed tuners, contain a high gain R.F. stage of amplification. For excellent signal-to-noise ratio a triode-type stage is employed. Such high gain high frequency circuit utilizes neutralizing trimmer and feed-through capacitors. To insure stability over ambient voltage and temperature changes, and effective reception of all the channels, close parameter preadjustment is requisite.

The present invention is particularly advantageous and useful in such V.H.F. tuners. A low-loss mica or equivalent feed-through condenser construction is provided, having a common central electrode. A displaceable plate is arranged opposite the central electrode, with air insulation layer therebetween. Simple means is provided to alter the capacitative relation between the plate and the electrode. An independent trimmer type capacitor is thus electrically and mechanically integrated with the otherwise fixed feed-through capacitance.

The compound capacitor of this invention is rugged, stable, low-loss, and relatively inexpensive to fabricate. Further, it lends itself to significant economies in circuital arrangement and physical incorporation in V.H.F. tuners. Such characteristics of and savings through the invention capacitor are very important in competitive mass produced units, as television tuners.

The above and further features, advantages and objects of the present invention will become more apparent from the following description of exemplary forms thereof, illustrated in the drawing, in which:

FIGURE 1 is a plan view of an exemplary form of the invention capacitor.

FIGURE 2 is an enlarged cross-sectional view through the capacitor of FIGURE 1, taken along the line 2—2 thereof.

FIGURE 3 is a partial plan view of a modified form of the capacitor of FIGURE 1.

FIGURE 4 is a schematic circuit diagram of the composite capacitor hereof.

The basic construction of the exemplary combination feed-through and trimmer capacitor 10 is shown in FIGURES 1 and 2. A metallic central electrode or feed-through segment 11 is capacitatively related to the metallic case 12. Two dielectric layers, preferably mica for low loss operation, separate and insulate electrode 11 from case 12. Both faces of mica layer 15 are preferably silvered, at 17 and 18. The case 12 contains integral top clamps 20 and 21 at each end, bent over to form a fixed assembly of the mica layers 15, 16, and central feed-through electrode 11 with the case 12.

A predetermined fixed feed-through capacitance section results between electrode 11 and the case 12. Its magnitude is determined by the size of the segment 11, its spacing from the case 12, its top clamps 20, 21 and integral side flanges 22, 23, as will be understood by those skilled in the art. The variable or trimmer capacitance section of capacitor 10 is composed of a metal trimmer plate 25 adjustably supported at a well 26 of the case 12, above mica layer 16.

The capacitor 10 is shown with a flat rectangular feed-through electrode and a corresponding rectangular well 26. The well 26 conforms generally in outline to that of trimmer plate 25, to permit adjustable settings of the plate with respect to electrode 11. In the exemplary capacitor 10 plate 25 extends over onto the top clamps 20, 21, its ends 25a, 25a pressing onto these case extensions. The plate 25 is made of resilient material and is adjustably flexed into well 26 through an adjusting screw 28, for its trimmer capacitance action.

The center of trimmer plate 25 is secured to the central adjusting screw 28 as by a palnut 30. Palnut 30 contains springy upset portions 31, 32 that press on the threads of screw 28 and firmly holds plate 25 therewith. As the screw 28 is rotated, its threads thereupon displace the center portion of plate 25 away or towards electrode 11, as indicated by the dashed line 33. This action correspondingly decreases or increases the incremental capacitance onto the basic fixed feed-through capacitance of capacitor 10.

The adjusting screw 28 passes through an aperture 29 in case 12, and clears an extended opening 34 in electrode 11. The head of screw 28 rests against case 12, and thereby maintains a stable flexed capacitative position of plate 25 in its settings. Rotation of screw 28 in either direction correspondingly alters such trimmer capacitance setting. Each such setting is thus stable and rugged. The palnut 30 may be eliminated by forming upsets in plate 25 corresponding to the upsets 31, 32.

Connection to the central feed-through electrode 11 is made at its terminals 35, 35. The case 12 is the other terminal and is generally soldered to the chassis. The trimmer plate 25 is always in electrical connection with the case 12, and so requires no terminal. Its adjustable settings serve to correspondingly change the total feed-through capacitance value in the circuit to which it is connected.

A modified construction is shown in capacitor 40 in FIGURE 3. Capacitor 40 is the same as capacitor 10 of FIGURES 1 and 2, with the same components, except that the ends 25a of the trimmer plate 25 extend to between the top clamps (21, 22) and the mica layer 16. The plate ends 25a are held down by the clamps, yet are arranged to be slidable longitudinally to permit variable flexing of the plate 25 by the adjusting screw 28 (see FIGURE 1). The resilient plate 25 action in capacitor 40 is reversed to that of capacitor 10, with the plate normally pressing towards electrode 11. A suitable washer or stop for screw 28 is employed to hold it to the case 12.

The electrical action of the invention capacitors 10 and 40 is illustrated in FIGURE 4. The case 12 and its extensions 12' that include the top clamps (20, 21) and sides (22, 23) are at ground connection, and form a fixed predetermined capacitance value with the central feed-through electrode 11. The terminals 35, 35 of electrode 11 are connected into the circuit. A significant use for such feed-through capacitance is for example in the neutralization circuits for the triode R.F. stage of V.H.F. tuners described in Patent No. 2,949,580 issued on August 16, 1960 for Neutralizing Circuits, and assigned to the assignee of this case.

The variable adjustable capacitance portion 45 integrally incorporated in the invention capacitors (10, 40) is provided by the trimmer plate 25 in settable proximity to electrode 11. Plate 25 is insulated from electrode 11 and forms a minor portion of the net capacitance of the unit 10. It holds its settings and hence constitutes a "tunable" fixed-feed-through capacitance, i.e. adjustable in value to a minor extent, as ±10% of a nominal rating.

Plate 25 is connected to case 12 through screw 28 and its ends 25a; and such "internal" connection, indicated by dashed line 36, obviates a terminal or other interconnection therefor. A typical V.H.F. tuuner application of the present invention is one that has a fixed capacitance of 90 $\mu\mu f$, and a variable one (45) of up to 20 $\mu\mu f$. The capacitance range of such unit is therefore 90 to 110 $\mu\mu f$, and corresponds to a rating of 100 $\mu\mu f \pm 10\%$. Other combinations and ratings are, of course, feasible. With such capacitance trimming of the feed-through condenser (10, 40), a separate and costly variable neutralizing capacitor in the tuner R.F. circuitry, is readily eliminated.

Although the present invention has been described with exemplary embodiments, it is to be understood that modifications in its construction, shape, and arrangement may be made, and in its circuital applications, that are encompassed by the broader spirit and scope of the invention set forth in the appended claims.

I claim:

1. A capacitor of the character described comprising a longitudinally extending metallic casing to be connected to a fixed electrical potential, said casing containing a longitudinally extending central electrode capacitatively related to said casing along the length thereof, said central electrode having first and second terminals, dielectric means predeterminedly spacing the electrode with respect to said casing to form a feed-through condenser section of relatively fixed capacitance between said first and second terminals, said casing being formed with an open region opposite a portion of said electrode, a metallic member adjustably mounted at said open region in capacitive relation with said electrode portion, said last mentioned capacitative relationship providing additional capacitance connected between said first and second terminals, and means for altering the setting of said member with respect to said electrode to vary said last mentioned capacitance and provide a trimable condenser section in the capacitor, the setting of said member varying the overall capacitance established between said first and second terminals.

2. A capacitor of the character described comprising a longitudinally extending metallic casing to be connected to a fixed electrical potential; said casing containing a longitudinally extending central electrode capacitatively related to said casing along the length thereof, said central electrode having first and second terminals, dielectric means juxtaposed with said electrode predeterminedly spacing the electrode with respect to said casing to form a feed-through condenser section of relatively fixed capacitance between said first and second terminals, said casing being formed with an open region opposite a portion of said electrode, a flat metallic member of resilient material adjustably mounted at said open region in electrical connection with the casing and in capacitive relation with said electrode portion, said last mentioned capacitative relationship providing additional capacitance connected between said first and second terminals, and means for altering the setting of said member with respect to said electrode to vary said last mentioned capacitance and provide a trimable condenser section in the capacitor in electrical parallel relationship with respect to said feed-through condenser section, the setting of said member varying the overall capacitance established between said first and second terminals whereby the capacitor functions as an effective feed-through condenser having capacitance that is adjustable over a preset range.

3. A capacitor of the character described comprising a longitudinally extending metallic casing to be connected to a fixed electrical potential, said casing containing a longitudinally flat central electrode capacitatively related to said casing along the length thereof, said central electrode having first and second terminals, dielectric means juxtaposed with said electrode and predeterminedly spacing the electrode with respect to said casing to form a feed-through condenser section of relatively fixed capacitance between said first and second terminals, said casing being formed with a sizable open region opposite a flat portion of said electrode, a flat metallic member of resilient material adjustably mounted at said open region in electrical connection with the casing and in capacitive relation with said electrode portion, said last mentioned capacitative relationship providing additional capacitance connected between said first and second terminals, and means for altering the setting of said member with respect to said electrode to vary said last-mentioned capacitance and provide a trimable condenser section in the capacitor in electrical parallel relationship with respect to said feed-through condenser section, the setting of said member varying the overall capacitance established between said first and second terminals whereby the capacitor functions as an effective feed-through condenser having capacitance that is adjustable over a preset range.

4. A capacitor as claimed in claim 1, in which edge portions of said member are held within contiguous portions of the casing at the formed open region for maintaining the member stable in its capacitive settings.

5. A capacitor of the character described comprising a longitudinally extending casing to be connected to a fixed electrical potential, said casing containing a longitudinally extending central electrode capacitatively related to said casing along the length thereof, said central electrode having first and second terminals at its opposed longitudinal extremes, said first and second terminals providing means for electrically connecting said capacitor to an external circuit, dielectric means predeterminedly spacing the electrode with respect to said casing to form a feed-through condenser section of relatively fixed capacitance between said first and second terminals, a metallic member in capacitive relation with said electrode, and means for altering the setting of said member with respect to said electrode to vary said last mentioned capacitance and provide a trimable condenser section in the capacitor, the setting of said member varying the overall capacitance established between said first and second terminals, said means for resetting the member includes an adjusting screw and means connecting said screw with said member into desired trimming capacitance settings.

6. A capacitor as claimed in claim 2, in which edge portions of said member are slidably held within contiguous portions of the casing at the formed open region for maintaining the resilient member stable in its capacitive settings.

7. A capacitor as claimed in claim 4, in which said contiguous casing portions are integral top clamps of the capacitor.

8. A capacitor as claimed in claim 2, in which said contiguous casing portions are integral top clamps of the capacitor and said member is rectangular in shape with its end portions coacting with said top clamps.

9. A capacitor as claimed in claim 1, in which said means for resetting the member includes an adjusting screw extending through an aperture in the casing and means connecting said screw with said member for variably flexing the member into desired trimming capacitance settings.

10. A capacitor as claimed in claim 3, in which said means for resetting the member includes an adjusting screw extending through an aperture in the casing and means connecting said screw with said member at its central region for variably flexing the member into desired trimming capacitance settings.

11. A capacitor as claimed in claim 4, in which said means for resetting the member includes an adjusting screw extending through an aperture in the casing and nut means connecting said screw with said member at its central region for variably flexing the member into desired trimming capacitance settings.

References Cited by the Examiner

UNITED STATES PATENTS

| | | | |
|---|---|---|---|
| 1,200,063 | 10/1916 | Wheeler | 317—261 |
| 1,769,851 | 1/1930 | Nachumsohn | 317—249 |
| 2,550,308 | 4/1951 | Sporing | 317—261 |
| 2,636,107 | 4/1953 | Temple | 317—249 |
| 2,677,784 | 5/1954 | Jacobson | 317—249 |
| 2,753,515 | 7/1956 | Rickner | 317—246 |
| 2,785,350 | 3/1957 | Toppari | 317—242 |

FOREIGN PATENTS

| | | |
|---|---|---|
| 748,674 | 11/1944 | Germany. |
| 501,352 | 2/1939 | Great Britain. |

JOHN F. BURNS, *Primary Examiner.*